United States Patent
Lang et al.

[11] Patent Number: 5,912,871
[45] Date of Patent: Jun. 15, 1999

[54] RECORDABLE DISK RE-RECORDING SYSTEM

[75] Inventors: Michael S. Lang, Reston, Va.; Louis H. Weiss, New York, N.Y.

[73] Assignees: Sony Corporation, Tokyo, Japan; Sony Corporation of America, Park Ridge, N.J.

[21] Appl. No.: 08/831,178

[22] Filed: Apr. 2, 1997

[51] Int. Cl.[6] .................................................. G11B 7/00
[52] U.S. Cl. ........................ 369/84; 369/83; 369/58; 360/15
[58] Field of Search ................................ 369/83, 84, 85, 369/47, 48, 54, 58, 59; 360/13, 14.2, 15

[56] References Cited

U.S. PATENT DOCUMENTS

| | | | |
|---|---|---|---|
| 5,414,688 | 5/1995 | Inokuchi | 369/84 |
| 5,493,548 | 2/1996 | Kamioka | 369/83 X |
| 5,610,893 | 3/1997 | Soga et al. | 369/84 X |

*Primary Examiner*—Muhammad N. Edun
*Attorney, Agent, or Firm*—Jay H. Maioli

[57] ABSTRACT

An apparatus and method for re-recording a recordable disk using two recording heads including the steps of recording a program on a disk using a first record/playback head, playing back the program recorded during the recording step using the first record/playback head, setting start/stop flags to mark sections of the program to be re-recorded, playing back the program using the first record/playback head and simultaneously routing the sections of the program to be re-recorded to a second record/playback head, re-recording the sections of the program to be re-recorded using the second record/playback head, and erasing the remaining area of the disk which was not re-recorded during the re-recording step.

3 Claims, 3 Drawing Sheets

RECORDABLE DISK RE-RECORDING SYSTEM

BACKGROUND OF THE INVENTION

The present invention relates to a recordable disk re-recording system for use in disk-based home audio systems. More particularly, the recordable disk re-recording system is useful in circumstances where after recording a disk the user desires to keep only selected sections of the recorded program material.

Currently, there are a variety of systems for re-recording audio programs. These systems include dubbing decks similar to the widely popular cassette dubbing decks where a cassette with several recorded segments is placed on one side, and another cassette to re-record the segments the user wants to record is placed on the other side. In these systems when the user hears a segment being played from the first cassette, he or she presses the record button, and the segment is recorded on the second cassette until the stop button is pressed.

Re-recording systems originally used analog cassette tapes to record an original audio program that was, for example, broadcast by a radio station, played by an LP turntable, or reproduced by a CD player. In these systems, after the original audio program is taped, a second cassette tape is installed in the dubbing deck and selected sections can be re-recorded by the user. These analog re-recording systems are cumbersome to use and require two cassette tapes to accomplish their objective.

With the progress of digital technology digital disks that can be re-recorded have become available to consumers of audio products. An example of this disk based re-recordable system is the MINIDISC (MD) system, developed by SONY Corporation, using single-sided magnetic field modulation technology on a polycarbonate substrate.

While these re-recordable digital disks allow the designers of dubbing decks to be more creative, they are also more expensive than conventional analog cassette tape record/playback systems. Using the conventional dubbing system requires two disks, one for recording and playing back the original program, and a second one for re-recording user selected segments making the system expensive and difficult to use.

OBJECTS AND SUMMARY OF THE INVENTION

The present invention is intended to overcome the above problems and consists of an apparatus and method for recording, playing back, and re-recording user selected audio program segments utilizing only one disk.

Accordingly, it is an object of the present invention to provide an improved system for re-recording user-selected audio segments on a re-recordable disk using two recording heads.

In accordance with one aspect of the present invention, a recordable disk re-recording apparatus is provided including a first record/playback head, a first head driver for controlling the first record/playback head, a second record/playback head, a second head driver for controlling the second record/playback head, a record processor for receiving and processing a signal to be recorded and routing the signal to the first record/playback head, a playback processor for playing back an output from the first record/playback head, an edit interface for receiving user commands indicating segments to be re-recorded, a re-record processor for receiving the output from the first record/playback head and for routing the segments to be re-recorded to the second record/playback head, and a system controller for controlling the record processor, the playback processor, the re-record processor, the first head driver, and the second head driver.

In accordance with another aspect of the present invention, a method for re-recording a recordable disk using two recording heads includes the steps of recording a program on a disk using a first record/playback head, playing back the program recorded during the recording step using the first record/playback head, setting start/stop flags to mark sections of the program to be re-recorded, playing back the program using the first record/playback head and simultaneously routing the sections of the program to be re-recorded to a second record/playback head, re-recording the sections of the program to be re-recorded using the second record/playback head, and erasing the remaining area of the disk which was not re-recorded during the re-recording step.

These and other objects, advantages, and features of the present invention will become apparent to those skilled in the art upon consideration of the following description of the present invention.

DETAILED DESCRIPTION OF THE INVENTION

Figure 1:
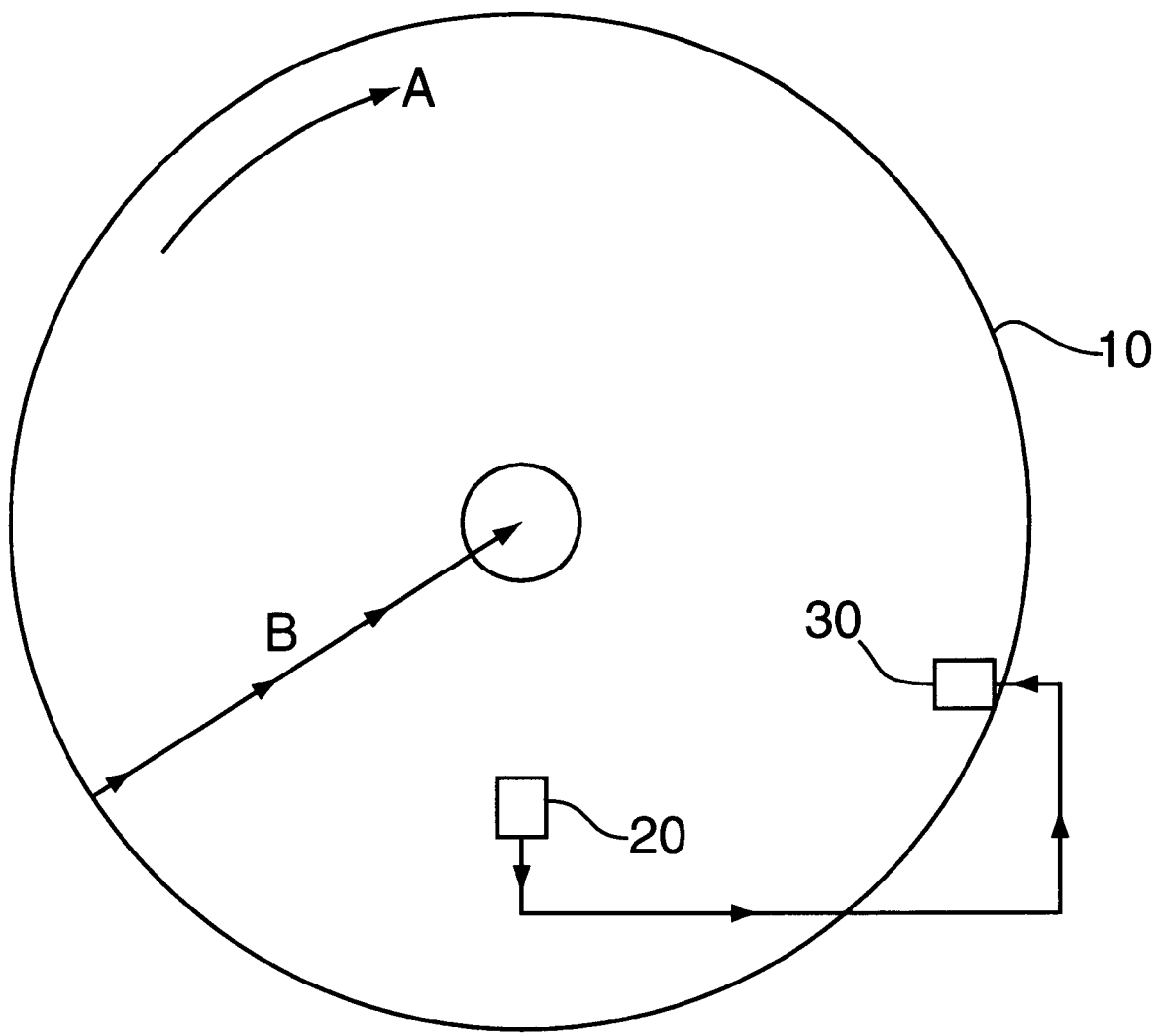
FIG. 1 shows a re-recordable disk and two heads according to an embodiment of the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawing.

Turning now to FIG. 1, a re-recordable disk system according to an embodiment of the present invention will be described. The re-recordable disk 10 in the embodiment of the present invention could be a MINIDISC (MD), developed by SONY Corporation, but other re-recordable disks could also be used. The disk rotates in the direction shown by the arrow A and is recorded in a circular pattern from the outside to the inside of the disk in this embodiment, the recording/playback head moving closer to the center of the disk with every rotation in the direction shown by the arrow B. The direction of the recording, and the rotation of the disk could be reversed without affecting the principle of this invention.

First, the disk 10 is recorded with an audio program. Next, upon playback, the user selects the segments to be re-recorded by a method that will be described in detail hereinafter. Then, the first head 20 sends a signal corresponding to the user selected segments to be re-recorded to a second head 30 to be re-recorded from the beginning of the disk, overwriting the previously recorded information. As can be seen, having a second head placed behind a first head in the direction of disk rotation eliminates the need for two disks or for expensive memory buffers to perform the user selected re-recording operation.

Figure 2:
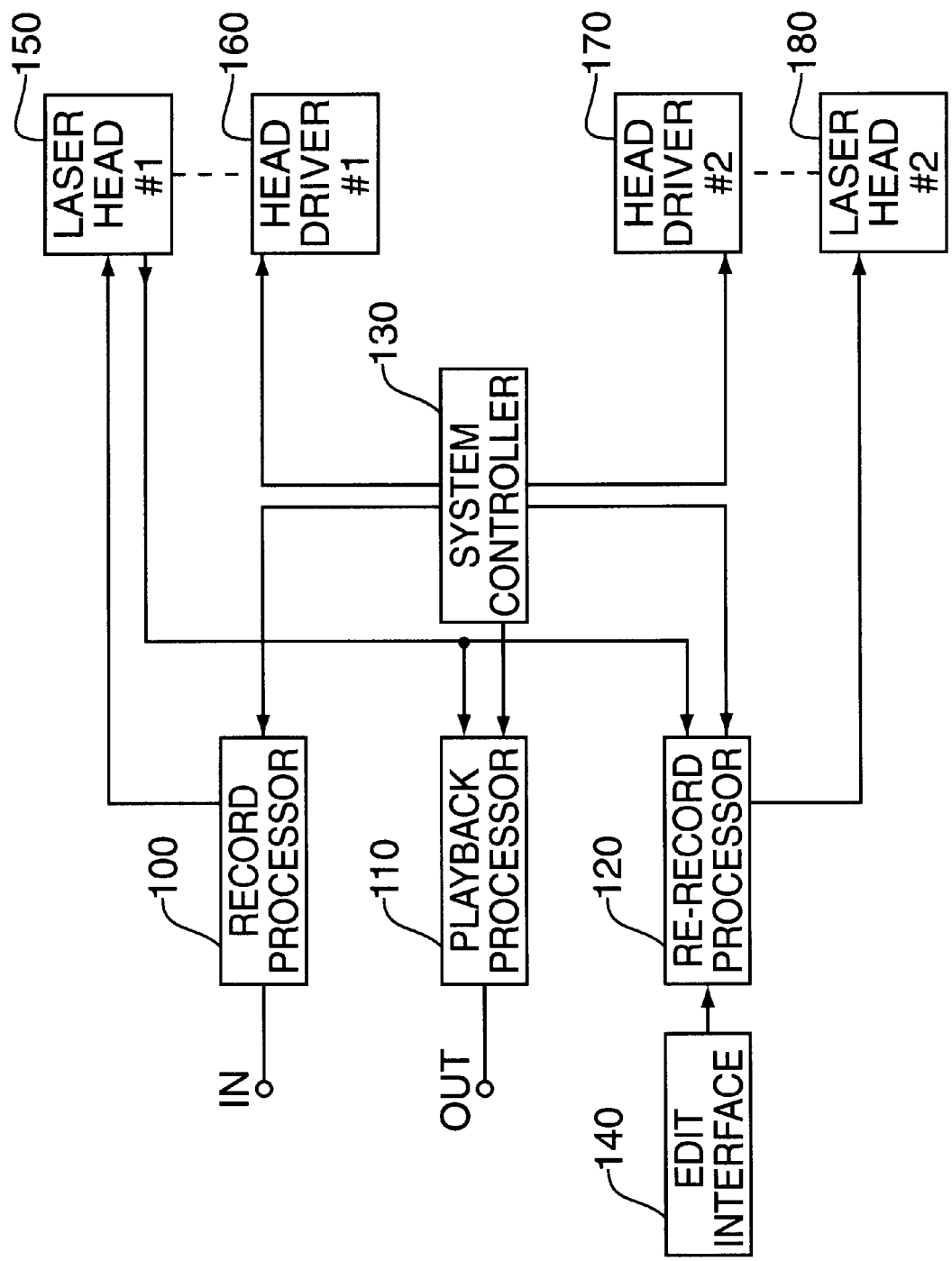
FIG. 2 is an schematic in block diagram form showing a recordable disk re-recording apparatus according to an embodiment of the present invention.

Turning now to FIG. 2, a recordable disk re-recording apparatus according to the embodiment of the present invention will be described. A record processor 100 for receiving an audio signal from a radio broadcast station, for example, is provided. The record processor 100 processes the signal using standard signal processing techniques and routes the processed signal to be recorded to a first record/playback head 150. The first record/playback head is controlled by a first head driver 160. A playback processor 110 is provided to output an audio signal that can be used by a speaker system or equivalent (not shown). The playback processor 110 receives as an input signal an output from the first record/playback head 150. An edit interface 140 for receiving user commands via a keyboard or keypad, for example, is provided. The commands entered by the edit interface 140 are, record, play, start re-recording, stop re-recording, and so on, for example. The start re-recording and stop re-recording commands set start/stop flags to mark the sections of the program to be re-recorded. A re-record processor 120 receives the commands entered by the edit interface 140 and the output from the first record/playback head 150. Then, the re-record processor 120 routes the sections or segments of the program to be re-recorded to a second record/playback head 180 which is controlled by a second head driver 170. Finally, a system controller 130 controls the record processor 100, the playback processor 110, the re-record processor 120, the first head driver 160, and the second head driver 170 according to an instruction set which includes the method steps that will be described next.

Figure 3:
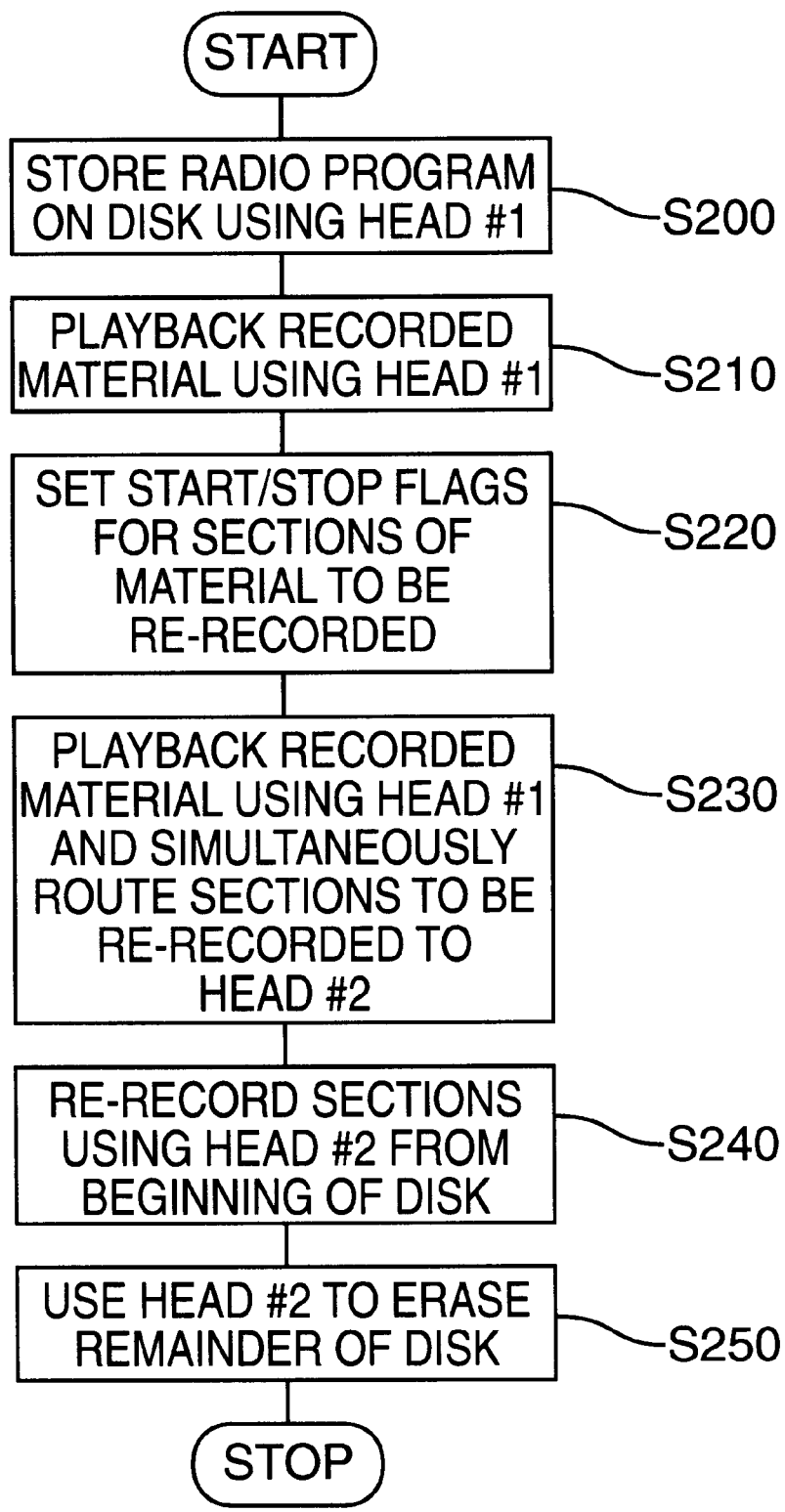
FIG. 3 is a flow chart showing a method for re-recording a recordable disk using two recording heads according to an embodiment of the present invention.

Turning now to FIG. 3, a method for re-recording a recordable disk using two recording heads according to the embodiment of the present invention will be described. In step S200 the user decides to record a radio program, for example, and the apparatus routes this radio program to the first record/playback head as described above. Next, in step S210 the user decides that there are some segments or sections of the program worth keeping, so the user decides to play back the recorded radio program, and the apparatus starts playing back the recorded radio program using the first record/playback head, which is described above. While listening to the playback the user sets start/stop flags selecting the sections or portions of the recorded program he wishes to keep in step S220. Simultaneously, in step S230 the selected sections being played by the first record/playback head are routed to the second record/playback head to be re-recorded from the beginning of the disk in step S240. Finally, in step S250, the remainder of the disk is erased by overwriting using the second record/playback head.

The above description is based on a particular embodiment of the invention, but it will be apparent that many modifications and variations could be effected by one skilled in the art without departing from the spirit of the invention. For example, the second record/playback head could be a record only head.

Thus, it is apparent that in accordance with the present invention an apparatus that fully satisfies the objectives, aims, and advantages is set forth above. While the invention has been described in conjuction with specific embodiments, it is evident that many alternatives, modifications, permutations, and variations will become apparent to those skilled in the art in light of the foregoing description. Accordingly, it is intended that the present invention embrace all such alternatives, modifications and variations as fall within the scope of the appended claims.

What is claimed is:

1. A recordable disk re-recording apparatus for playing back and re-recording a program from and to the same recordable disk, comprising:

a first record/playback head arranged on the recordable disk;

a first head driver for controlling a radial position of said first record/playback head relative to the disk;

a second record/playback head arranged on the recordable disk behind said first record/playback head in a direction of disk rotation;

a second head driver for controlling a radial position of said second record/playback head relative to the disk independently of the radial position of said first record/plavback head;

a record processor for receiving and processing a program signal to be recorded and routing a processed program signal to said first record/playback head;

a playback processor for processing the program signal reproduced from the recordable disk by said first record/playback head;

an edit interface for receiving user commands including commands indicating segments of the reproduced program signal to be re-recorded;

a re-record processor for receiving said reproduced program signal output from said first record/playback head and for routing said segments to be re-recorded to said second record/playback head for recording on the recordable disk thereby; and a system controller for controlling said record processor, said playback processor, said re-record processor, said first head driver, and said second head driver.

2. A method for playing back and re-recording a program from and to a recordable disk using two recording heads that are respectively independently movable relative to the recordable disk, comprising the steps of:

recording a program on the recordable disk using a first record/playback head;

playing back from the recordable disk said program recorded during said recording step using said first record/playback head;

setting start/stop flags to mark sections of said program being played back to be re-recorded on the recordable disk;

playing back said program from the recordable disk using said first record/playback head and simultaneously routing to a second record/playback head arranged on the recordable disk behind the first record/playback head in a direction of disk rotation said sections of said program to be re-recorded on the recordable disk; and re-recording said sections of said program to be re-recorded on the recordable disk using said second record/playback head.

3. The method according to claim 2, further comprising the step of:

erasing a remaining area of the disk not re-recorded during said re-recording step.

* * * * *